US006024353A

United States Patent [19]

Christeson

[11] Patent Number: 6,024,353

[45] **Date of Patent: *Feb. 15, 2000**

[54] RETAINING PARELLELS

[76] Inventor: Michael E. Christeson, 260 Las Alturas, Santa Barbara, Calif. 93103

[ * ] Notice: This patent is subject to a terminal disclaimer.

[21] Appl. No.: 08/969,898

[22] Filed: Nov. 13, 1997

Related U.S. Application Data

[62] Division of application No. 08/451,773, May 26, 1995, abandoned.

[51] Int. Cl.[7] ........ B23Q 3/06

[52] U.S. Cl. ........ 269/277; 269/296

[58] Field of Search ........ 269/277, 254 R, 269/157, 275, 264, 258, 239, 257, 271, 296; 267/158, 164, 163, 160

[56] References Cited

U.S. PATENT DOCUMENTS

| | | |
|---|---|---|
| 1,335,247 | 3/1920 | Lask . |
| 1,336,087 | 4/1920 | O'Shaughnessy . |
| 3,575,406 | 4/1971 | Viollet . |
| 4,558,856 | 12/1985 | Shaffer . |
| 5,222,997 | 6/1993 | Montgomery . |

*Primary Examiner*—Robert C. Watson
*Attorney, Agent, or Firm*—Leo F Costello

[57] ABSTRACT

An apparatus is provided for retaining parallels against vise jaws during the entire cycle of performing a machining operation. The subject method and apparatus apply sufficient forces at the places and angles necessary to avoid any flutter or movement of the parallels outwardly away from or transversely across the faces of their respective jaws. By use of the subject invention, the parallels are retained against the jaws of the vise over a range of jaw gaps from a very narrow gap to the maximum jaw gap of vises typically used in machine shops. Also, undesirable movement of the retaining apparatus relative to the vise and parallels is restricted. The apparatus has a low profile and is located in the space under the machining area so that it does not interfere with the machining operations, but if contacted by the machine tool, will be sacrificed rather than the more expensive tool.

9 Claims, 6 Drawing Sheets

RETAINING PARELLELS

This application is a division of application Ser. No. 08/451,773, filed May 26, 1995, now abandoned.

FIELD OF THE INVENTION

This invention pertains to retaining parallels and more particularly to an apparatus for retaining parallels against the jaws of a vise.

BACKGROUND

It is well known in machining operations to support a workpiece in a vise on a pair of precision parallels. In supporting the work, the parallels take the majority of the vertical force applied to the work during the operation being performed. In addition, the parallels aid visibility, ease the changing of workpieces, avoid damage to the ways, and facilitate lubrication. Of course, because of their precision manufacture, the parallels are intended to provide an exact resting surface for the workpiece.

Because of the environment in which the parallels are used, however, their use does result in several problems which tend to detract from their intended purposes. That is, in machining parts, the operational cycle is typically as follows: place the part onto the parallels and between the jaws of the vise, close the jaws, perform the machining process, clean the surfaces with an air blast, open the jaws, remove the part, clean the area between the parallels with an air blast, reset the parallels against the jaws, place the next part to be processed onto the parallels, and repeat the foregoing steps.

It is during the above-described operational cycle, which includes cleaning, that chips produced may fall or be blown into the area between a jaw and its adjacent parallel and/or on top of the parallel. In addition, the movement of the work may move the parallel away from the adjacent jaw or out one side or the other of the vise, or away from the jaw at an angle, or tilt the parallel at an angle to the ways on which it rests.

The described intrusion of chips and/or the movement of the parallels tend to detract from the intended purposes of the parallels, compromise the quality of the work-support system, and increase the probability that the tolerances specified for the work will not be met. For example, a chip under the work or parallel will cause the work to be at an incorrect angle to the tool being used. Also, if the parallel has moved away from the jaw, the work may tilt in the jaw as the vertical force is applied, again risking ruin of the work. Further, if the parallel is not intimately against the jaw, a tool passing through or past the work may strike the parallel, thereby damaging the tool, the parallel, and/or the work.

Therefore, although parallels are intended to make a machining operation more precise, they are often the source of problems which add to the difficulty of achieving precision. The inconsistent position of the parallels introduces a variable into the process which requires the machinist to devote time and effort in inspecting and adjusting the parallels to insure the integrity of the work-support system.

In an attempt to minimize the above-described problems associated with parallels, machinists commonly resort to two expedients, neither of which is a solution to the problems.

The first expedient is to place double-sided adhesive tape between each jaw and its adjacent parallel and to press the parallel toward the jaw. This technique is difficult to achieve since the surfaces are often covered with a film of oil, and the tape needs to be replaced periodically. Also, there is a gap between the parallel and the jaw equal to the thickness of the tape, and chips tend to accumulate in this gap and on the adhesive tape.

The second expedient is to insert individual compression springs between the parallels to force them against their respective jaws. These springs are difficult to insert, because of the oily surfaces, and they tend to fly out unexpectedly. Moreover, they are unstable and can be dislodged by bumping the parallels, or by a chip driven into the area below the work, or by the cleaning blast of air. In addition, the spring forces available by individual springs, manually compressed and inserted, are too small to retain the parallels against the jaws with any degree of reliability during the operating cycle. In particular, even with such a spring in place, the cleaning blast of air may cause the parallel to flutter against the jaw and thus move or permit the intrusion of chips. An example of this second expedient is shown in U.S. Pat. No. 3,575,406 to Violett, although this patented device involves specially-made parallels not readily available.

A parallel holding device using a spring band is disclosed in U.S. Pat. No. 4,558,856 to Shaffer, but this device also does not solve the above-described problems with parallels. As with the simple compression springs noted above, the Shaffer device does not apply holding forces at the places or points necessary to achieve control over the parallel. Simple forces directed perpendicularly against the parallel, as with a compression spring and the band spring device of Shaffer, allow the parallel to move laterally of the vise, that is, across the face of the jaw. Moreover, as the jaw gap increases toward the maximum gap width with wider workpieces, or when using the soft jaws instead of the hard jaws to hold the workpiece, the spring forces available with such a device decrease, resulting in smaller holding forces. Conversely, as the jaw gap decreases toward very narrow gaps, the device would tend to interfere with closing of the jaws. Also, the device itself is subject to accidental movement inwardly or transversely relative to the vise or the parallels, for example, by the machinist bumping against the band or otherwise, thus introducing instability to the arrangement.

SUMMARY

The present invention is directed to a method and apparatus for retaining parallels which overcomes the problems described above. The subject method and apparatus retains the parallels against vise jaws during the entire operating cycle with sufficient forces applied at the places and angles necessary to avoid any flutter or movement of the parallels outwardly away from or transversely across the faces of their respective jaws. Moreover, the method and apparatus of this invention is able to retain the parallels against the jaws of the vise over a range of jaw gaps from a very narrow gap to the maximum jaw gap of vises typically used in machine shops. Also, undesirable movement of the retaining apparatus relative to the vise and parallels is restricted.

It is an object of the present invention to provide a method and apparatus for retaining parallels against the jaws of a vise during the normal operational cycle of processing a workpiece including the cleaning steps.

It is another object to avoid undesired movement of parallels relative to their vise jaws after the parallels have been placed in desired positions against the jaws.

A further object is to prevent machining chips from lodging between the jaws of a vise and parallels placed against the jaws.

Still another object is to allow precision-manufactured parallels to perform their function of precisely supporting a part to-be-machined without moving and introducing a variable into the process requiring the machinist's time and effort to control.

Yet another object is to reduce the probability of error in the machining of parts, as well as the damage to parts and resultant waste, caused by the movement of parallels out of their intended positions.

Another object is reduce the time that is now required by a machinist to clean under the parallels and between the parallels and their respective jaw and to reset the parallels.

A further object is to enable a machinist to produce more accurate parts faster and more consistently.

It is yet another object to apply retaining forces against the parallels in a vise so as to prevent movement of the parallels away from or transversely of their respective jaws.

Another object is to retain parallels against their vise jaws in a manner which does not interfere with the normal operation of the machining operation.

It is an object of this invention to provide a low-profile device for retaining parallels which accommodates the commonly used heights of parallels and provides clearance between the workpiece and the device.

A still further object is to enable a machinist conveniently and manually to retain parallels against the jaws of a vise while producing sufficient forces to hold the parallels against the jaws throughout the range of jaw gaps used in a typical vise.

Yet another object is to provide a parallel retaining method and apparatus which accommodates the entire range of jaw opening widths, including the use of soft jaws, instead of the hard jaws, to clamp the work.

Another object is to provide a parallel retaining apparatus which can retain the parallels in position without moving while being subjected to normal vibrational forces occurring during machining operations and also to air blasts occurring during cleaning operations.

It is another object is to restrict the movement of a parallel retaining device relative to the vise in which it is used so as to minimize the chances for disturbing the position of the retaining device if, for example, it is accidentally bumped.

Another object is to provide a parallel retaining device which minimizes the loss due to damage to components which are exposed to machine chips and tools and which is sacrificed before the tool.

DETAILED DESCRIPTION OF THE APPARATUS

Figures 1, 1A, 1B, 1C, 2:
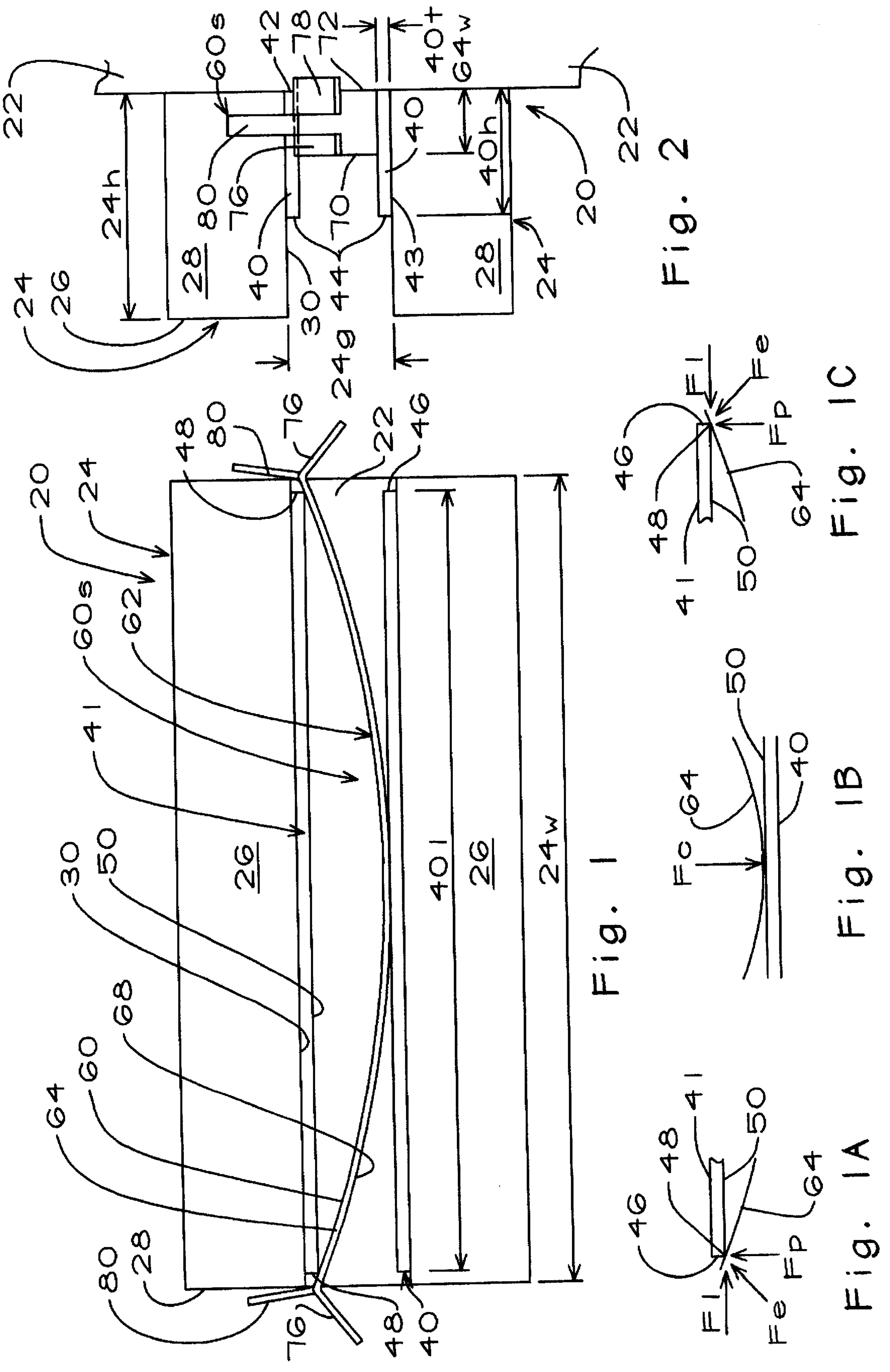
FIG. 1 is a fragmentary plan view of a vise showing parallels against the jaws of the vise and a single spacer spring between the parallels in accordance with the principles of the present invention.
FIGS. 1A, 1B, and 1C are schematic force diagrams showing forces occurring during the operation of the apparatus shown in FIG. 1, as well as the other embodiments of this invention.
FIG. 2 is a fragmentary end elevation of the apparatus shown in FIG. 1.
Figure 4:
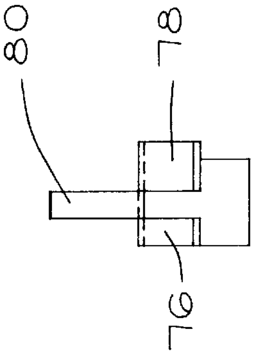
FIG. 4 is a plan view of the single spacer spring shown in FIG. 3.

A milling machine or similar equipment, not shown, utilizes a vise which is partially shown in FIGS. 1 and 2 and identified by the numeral 20. As is well known, the vise includes a bed or ways 22 and jaws 24, one of which is movable toward and away from the stationary jaw between clamping and releasing positions. For purposes of subsequent reference, the jaws have top faces 26, end faces 28, and clamping faces 30.

The typical vise, as 20, is either a six-inch wide or an eight-inch wide vise. This is the common terminology used, and is actually the width of the jaws between the end faces 28 thereof, that is, transversely of the path of movement of the movable jaw. Although the subject invention is not limited to a particular size of vise, it is convenient in the subsequent description to refer to particular dimensions of a specific example in order to facilitate a better understanding of the invention. Thus, in the following discussion, it will be understood that the dimensions used will have reference to a six-inch vise, it being further understood that the principals of the invention are applicable to other vises of larger or smaller dimensions with appropriate size changes.

The vise 20 has a jaw height **24*h*, measured vertically above the ways 22 (FIG. 2); a jaw width 24*w*, measured transversely of the path of movement of the movable jaw as above explained (FIG. 1); and a jaw gap 24*g*, measured along the jaw path (FIG. 1). In the typical six-inch vise, the jaw width 24*w* measures 6.12 inches, the jaw height 24*h* measures 1.735 inches, and the maximum jaw gap 24*g*** measures 6³⁄₃₂ inches.

As is well-known, a six-inch vise, as 20, has hardened jaws, as 24, which contact the work and thus perform the clamping function. Behind these hardened jaws are soft jaws, not shown, which are driven by the powering force, typically a screw or a piston driven by compressed air, again not shown, but well understood in the art. A workpiece, not shown, which is larger than the maximum jaw gap **24*g* between the hardened jaws, can thus be clamped by removing the hard jaws and clamping the workpiece between the soft jaws. As will be understood in the subsequent description, the subject invention accommodates such jaw gaps or openings larger than the gap between the hard jaws. When the hardened jaws are removed, the maximum jaw gap 24*g*** between the soft jaws is approximately 7.5 inches.

A matched pair of precision parallels 40, 41 (FIGS. 1 and 2) is incorporated in the vise 20. As is well known, these parallels are rectangular in shape and are relatively thin having lower edges 42 resting on the ways 22, outside faces respectively engaging their adjacent clamping faces 30 of the jaws 24, upper ledges 44 spaced below the top faces 26 of the jaws, opposite ends 46 spaced inwardly of the end faces 28 of the jaws, and inside faces 50 opposite to each other. For descriptive convenience, each parallel has a height 40*h* (FIG. 2) and a length 40*l* (FIG. 1).

Parallels, as 40, 41, to be used in a six-inch vise, as 20, are typically of a length 40*l* of six inches and a thickness 40*t* of upwards from 1/32 inch. Such parallels are supplied in a progression of heights 40*h* as matched pairs, the shortest height being typically 0.5 inch and the tallest height being typically 1.75 inch.

With the parallels 40, 41 properly positioned in the vise 20, as shown in FIGS. 1 and 2, the six inch length of each parallel causes it to be positioned as previously described, that is, with its end faces 26 spaced just inwardly of their respective end faces 28 of the jaws 24. Also, by reference to FIG. 2, it will be noted that the height 40*h* of each parallel is less than the height 24*h* of its associated jaw. As is well known, workpieces, not shown, to be machined are supported on the ledges 44 of the parallels 40 so that a part of the workpiece projects above the top faces 26 of the jaws. Depending on the thickness of the workpiece, the parallels are selected to provide parallel heights 48*h* which will allow the workpiece, when supported on the parallels, to project upwardly from the jaws by the preferred distance depending on the machining operation to be performed. With the workpiece supported on the parallels, it is noted that there is an open space between the parallels underneath the workpiece, as will be understood by reference to FIG. 2.

Figure 3:
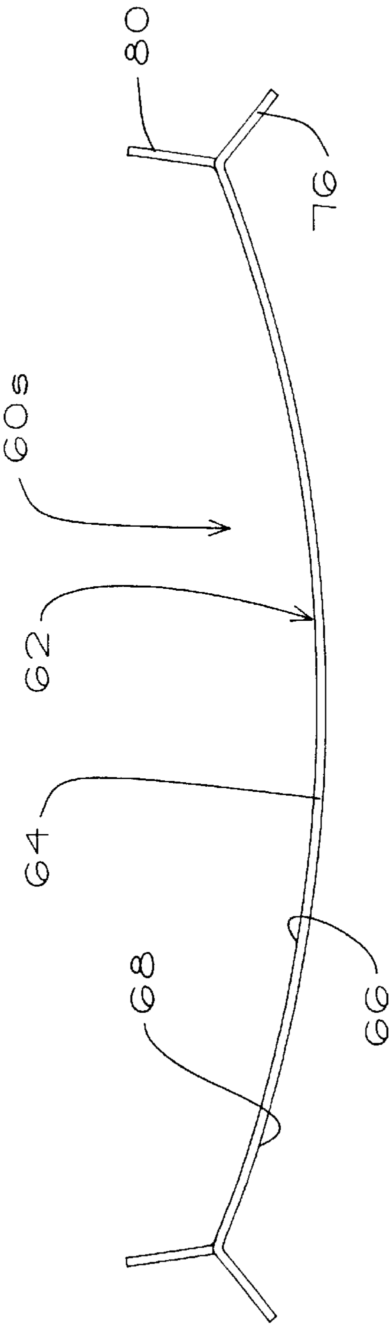
FIG. 3 is an edge view of the single spacer spring utilized in the apparatus of FIG. 1.
Figure 5:
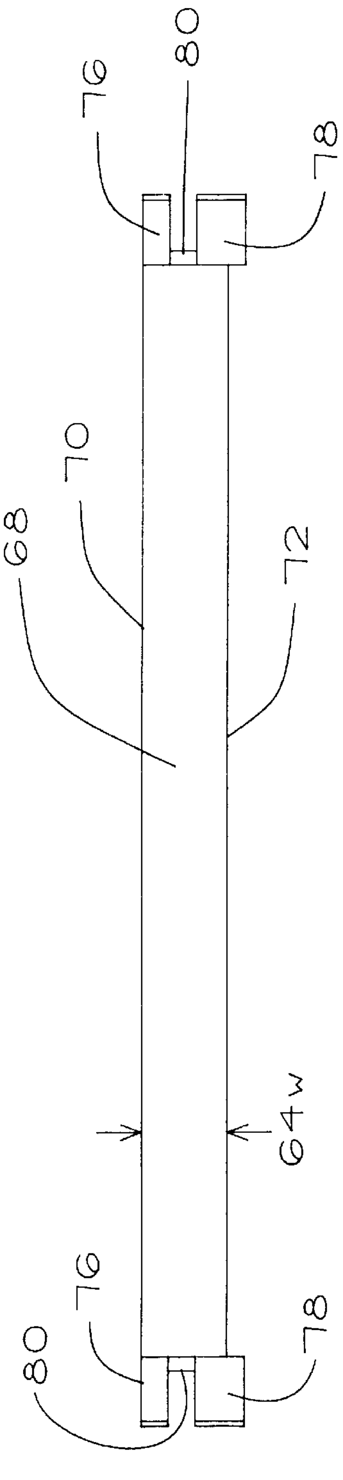
FIG. 5 is an end view of the single spacer spring shown in FIG. 4.

Having described the general environment of a vise 20 and parallels 40, 41 in which the subject invention is utilized, reference is now made to a retaining apparatus 60S (FIGS. 1–5) incorporating the principals of the present invention. The retaining apparatus 60S provides a single spring spacer 62, including an elongated, flat, leaf spring 64. The leaf spring is made of thin metal, preferably spring steel of the type 301FH of 0.05 inch thickness, and is curved lengthwise thereof preferably around a four-inch diameter mandrel having an axis extending transversely of the spring. Thus, the spring has a concave surface 66, a convex surface 68, an upper edge 70, and a lower edge 72, the terms "upper" and "lower" having reference to the position of the spring when in use. Upper, lower and middle end tabs or handles 76, 78, and 80 divergently project from opposite ends of the leaf spring, as best shown in FIGS. 3 and 5. At each end of the spacer, the upper and lower end tabs are coplanar and project to one side of the leaf spring at an angle of about sixty degrees, whereas the single, middle end tab projects on the opposite side of the leaf spring also at an angle of about sixty degrees.

Although as explained above, the subject invention is not limited to particular dimensions, it is useful to refer to the preferred dimensions of the spring spacer 62 as used in a six-inch vise 20. Thus, the length of the leaf spring 64 between the end tabs 76, 78, and 80 is preferably 6.25 inches; and the length of each end tab is approximately 0.5 inch. It is further noted that the width of the upper end tab 76 is approximately 0.153 inch, whereas the width of each lower end tab 78 is approximately 0.27 inch. Still further, the width 64*w* of the leaf spring is approximately 0.50 inch.

Figure 6:
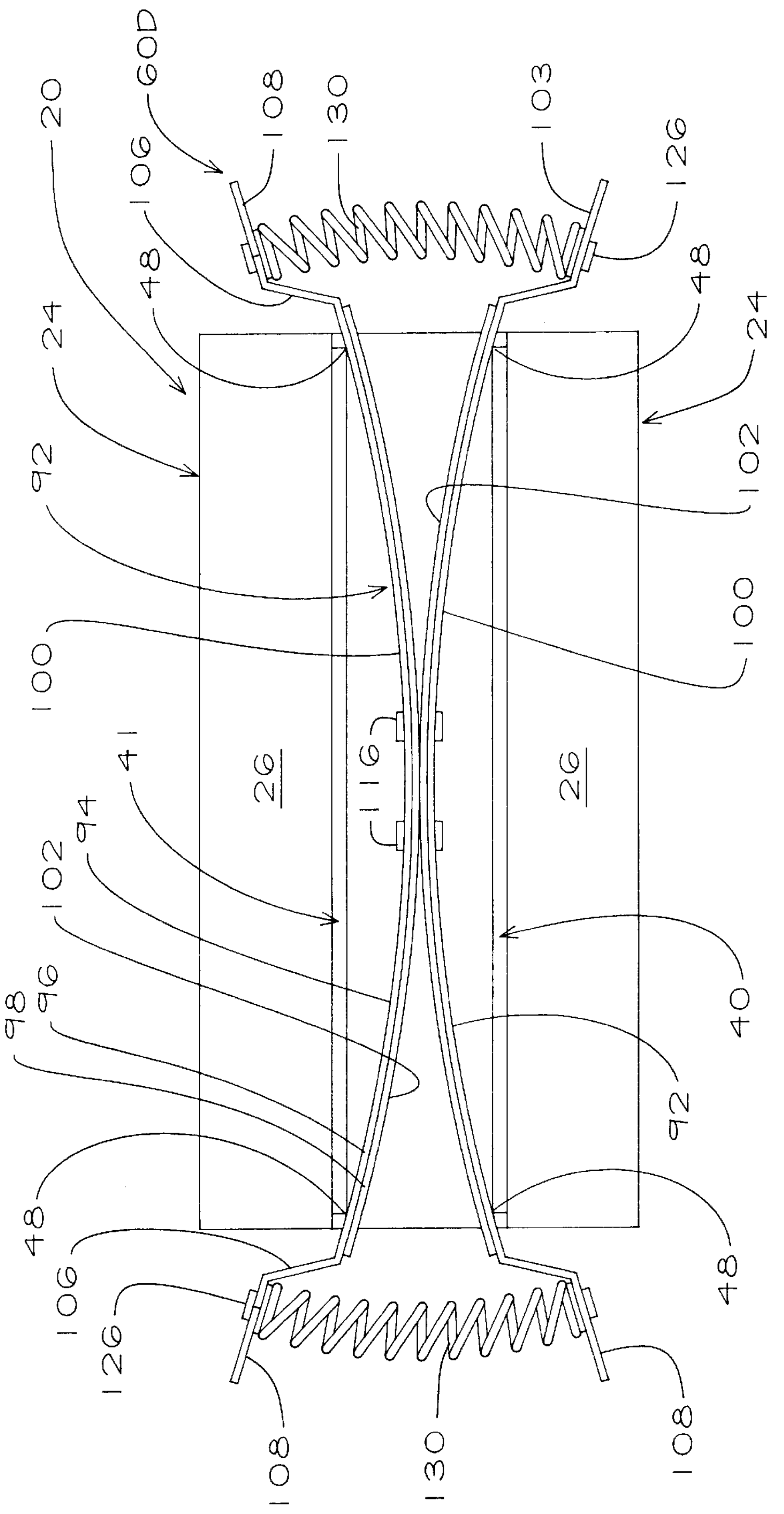
FIG. 6 is a fragmentary plan view of a vise similar to FIG. 1 but showing dual spacer springs also in accordance with the principals of the present invention.
Figure 7:
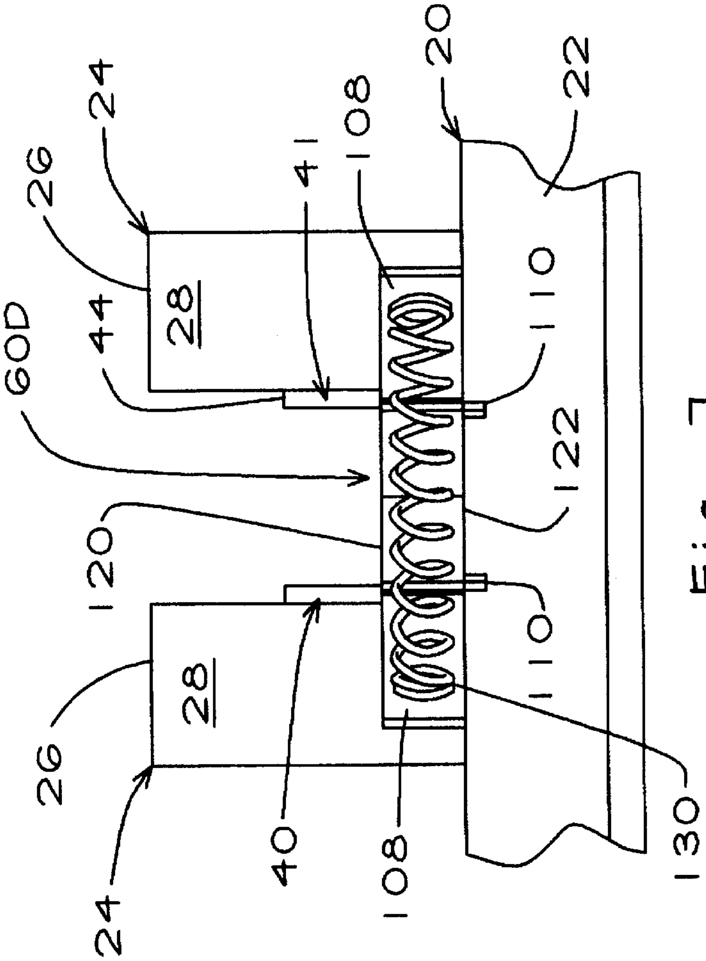
FIG. 7 is fragmentary end elevation of the apparatus shown in FIG. 6.

Referring now to FIGS. 6 and 7, a second embodiment of the retaining apparatus of the present invention is identified by the reference numeral 60D. This embodiment of the retaining apparatus provides a dual spring spacer or main spring assembly 92 including a pair of elongated, flat, leaf springs 94 which are curved lengthwise thereof from end to end. Each leaf spring includes a back leaf 96 and a center leaf 98, thereby defining a concave surface 100 and a convex surface 102 for each leaf spring. Flanges 106 extend angularly from each end of each back leaf 96, and handles 108 extend endwardly from each flange in generally parallel relation to its respective back leaf. End tabs 110 (FIG. 8) project laterally from each end of the center leaf 98 immediately adjacent to the flanges 106.

Figure 8:
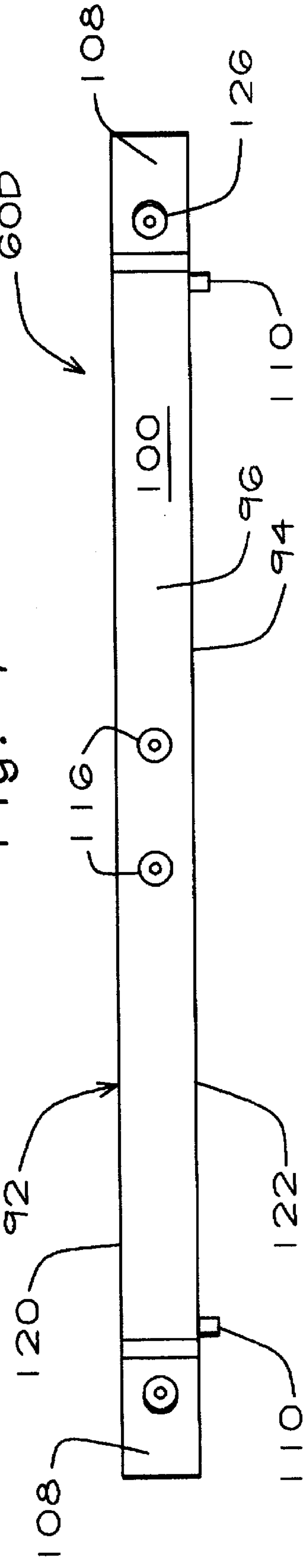
FIG. 8 is a side view of the dual spacer springs shown in FIG. 6.

The lengthwise curvature in each leaf spring 94 is preferably imparted to the spring in the following manner. The leaf springs are preferably made of spring steel of the type 301FH S/S, 2B. After the flanges 106 and handles 108 are formed at the ends of each back leaf 96, the back leaf is bent around a four inch diameter mandrel about an axis extending transversely of the back leaf. Similarly, after the end tabs 110 are formed on the center leaf 98, the latter is bent around a four-inch diameter mandrel, again around an axis extending transversely of the center leaf. Then, the center leaf and back leaf of each leaf spring are joined together lengthwise thereof in congruent overlapping relation. Referring to FIG. 8, the dual spring spacer 92 has a width 92*w* and upper and lower edges 120 and 122.

Circular spring retainer discs 126 are fastened to the inside surfaces of the handles 108, and relatively large, main coil compression springs 130 extend between the handles with their opposite ends around and connected to the retainer discs. These main coil springs are of such length as to be almost fully extended and under minimum compression, with the handles at their maximum spacing and with the leaf springs 94 relaxed or unstressed, when the retaining apparatus 60D is not in use in a vise. Also, each main coil spring has sufficient yieldability to be compressible in one hand of a machinist, and yet together, these coil springs are of sufficient strength to force the leaf springs apart when released from the machinist's grip.

As in discussing the retaining apparatus 60S it is also useful to provide preferred dimensions of the retaining apparatus 60D. Therefore, for use with a six-inch vise, as 20, the length of the back and center leaves 96 and 98 is 6.625 inch; the thickness of each leaf is 0.05 inch; the length of each flange 106 is 0.50 inch; and the length of each handle is 0.75 inch. Moreover, it is preferred that each flange 106 project angularly from its back leaf by an angle of approximately sixty degrees. Also, the end tabs 110 of each center leaf 98 preferably project from the center leaf by a distance of 0.125 inch and are approximately 0.093 inch wide. In addition, the main coil springs 130 have a relaxed or free length of 2.50 inch, a spring weight of 4.2 pound-inches, a diameter of 0.360 inch, and are made of 0.026 inch diameter wire.

Figure 9:
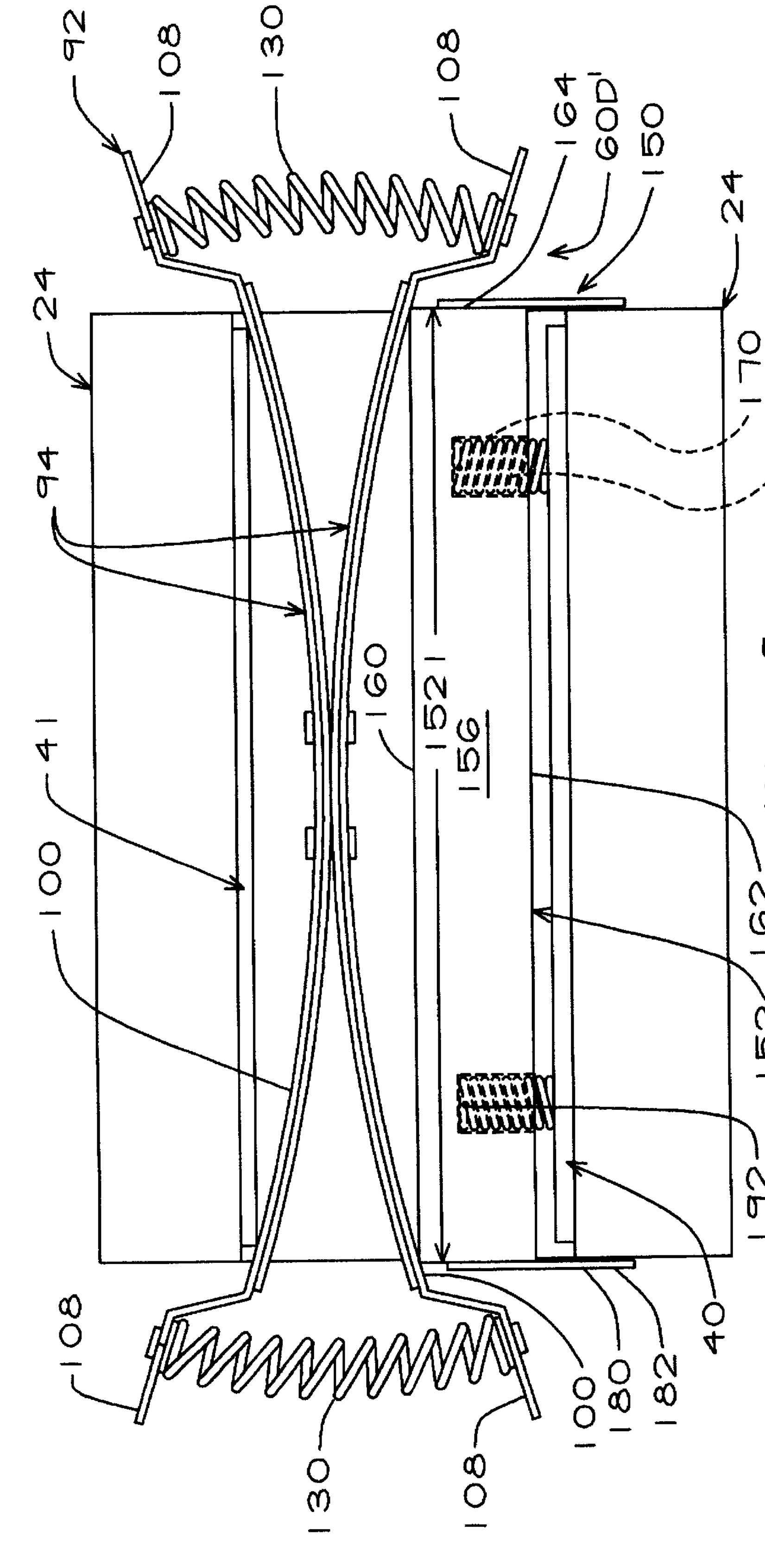
FIG. 9 is a fragmentary plan view similar to FIG. 6 but showing a spacer block incorporated between the dual spacer springs and one of the parallels.
Figure 9A:
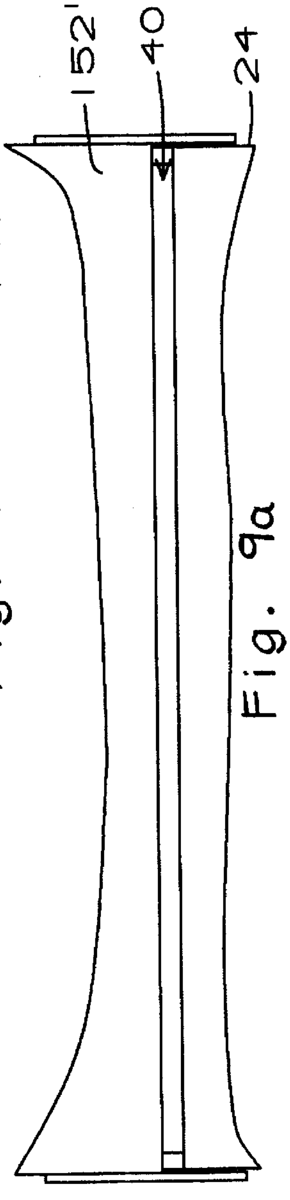
FIG. 9A is a fragmentary view of a portion of FIG. 9 showing an alternate spacer block.
Figure 10:
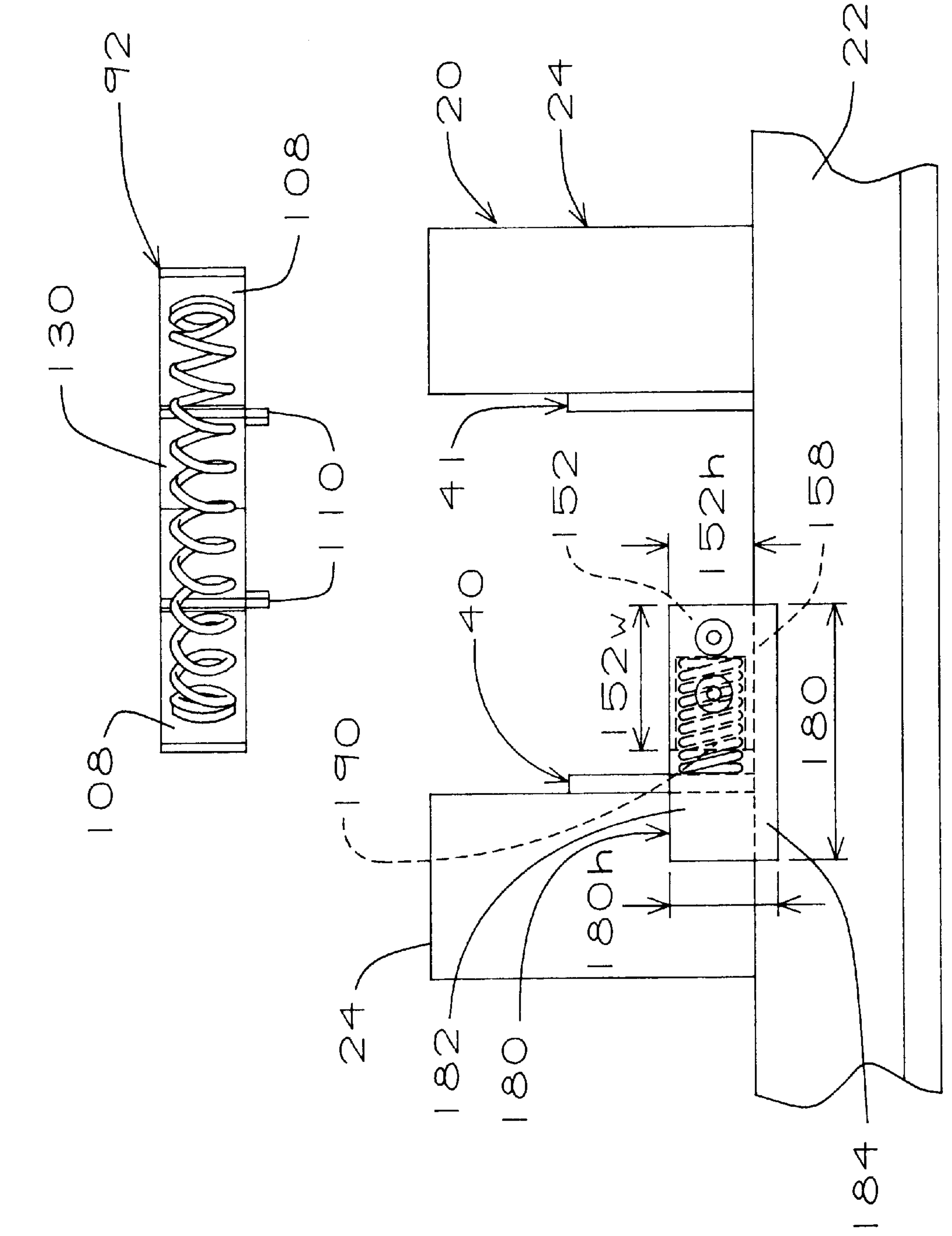
FIG. 10 is a fragmentary exploded end elevation of the vise and retaining apparatus of FIG. 9 with the dual spacer springs positioned above the vise and out of normal position, thereby to reveal certain features of the spacer block.

A variation of the retaining apparatus 60D is shown in FIGS. 9, 9A and 10 and is indicated by the reference numeral 60D'. The retaining apparatus 60D' includes a dual spring spacer 92 and a block spacer 150. The block spacer includes an elongated, solid block 152, preferably made of metal such as 6061 T6 aluminum, and has a rectangular cross section, as best seen in FIG. 10. The block 152 has a top surface 156, a bottom surface 158, an inside surface 160, an outside surface 162, and opposite end surfaces 164, each of which is rectangular in shape. Holes 170 are drilled into the block from the outside surface relatively adjacent to the ends of the block. For purposes of subsequent reference, the block has a length 152*l* (FIG. 9) and a height 152*h* and a width 152*w* (FIG. 10).

End plates 180 are fastened to the opposite end surfaces 164 of the block 152, and each end plate has rear and lower tabs 182 and 184, respectively, extending from the outside and bottom surfaces 162 and 158 of the block, as shown in FIG. 10. Again, for convenient reference, each end plate has a height 180*h* and a width 180*w* (FIG. 10). Relatively small, auxiliary coil compression springs 190 (FIG. 9) are fitted in the holes 170 and have outer ends projecting from the outside surface 162. Pins 192 fasten the inner ends of the springs to the block 152.

As shown in FIG. 9A, block 152' may be substituted under certain circumstances for the block 152. The block 152' has the same construction as the block 152 except that it omits the holes 170 and the springs 190.

As with the other parts of the subject apparatus, preferred dimensions are now set forth for the blocks 152 or 152'. Each such block has a length 152*l* greater than the width 24*w* of each jaw 24, as best shown in FIG. 9. For use with a six-inch vise, as 20, this length 152*l* is 6.187 inches. The height 152*h* of each block is 0.460 inch for a six-inch vise, and the width 152*w* varies between 0.750 inch and 5.00 inch depending on the particular application, as described in more detail subsequently. The height 180*h* of each end plate 180 for a six-inch vise is 0.585 inch, and the width 180*w* of these end plates varies from 1.195 inch to 5.445 inches depending on the application, as described more specifically below.

DETAILED DESCRIPTION OF THE METHOD

In general, the method of the present invention involves the use of a single spring spacer 62, or dual spring spacers 92, or a combination of dual spring spacers 92 and selected block spacers 150, in each case to provide the required force and parallel retention over the range of jaw gaps 24*g* encountered in machining various workpieces. Before describing the detailed steps of the method, however, it is important to consider the amount of force necessary to achieve adequate parallel retention.

During the development of the present invention, tests were conducted to determine the force needed to retain the parallels, as 40,41, in position against the jaws, as 24, of a six-inch vise, as 20. These tests used an air blow gun equipped with an OSHA safety nozzle, one-hundred psig air supply, and a one-quarter inch inside diameter air-supply hose. During the tests, every effort was made to simulate a typical machinist producing parts. Air was blasted with the air blow gun at the parallel, as 40 or 41, with the distance between the nozzle of the blow gun and the parallel being approximately four inches and with the nozzle at various angles to the parallel. The conclusion of the test was that a seven-pound force applied at 0.23 inch above the ways, as 22, of the vise could retain the parallels without any flutter or movement along the jaw face, as 30. The purpose of selecting the distance 0.23 above the ways is that this is the center of the design height of 0.460. This provides 0.040 clearance between the bottom of a workpiece to be machined and the retaining apparatus 60S, 60D, or 60D', as the case may be, when using the shortest parallel, as 40 or 41, in common use which is 0.500 inch in height. For the example being described herein, therefore, a seven pound force is used as the amount required. It is to be understood, however, that the invention is not limited to such a force, and that forces of greater or lesser amounts would apply to vises and parallels of different sizes, with the parts of the apparatus of the present invention being scaled to suit the application.

Nevertheless, in the example presented, it is preferable that a force of seven pounds be applied against each parallel 40, 41. Thus, the preferred embodiments of the single spring spacer 62, the dual spring spacer 92, and the combination of the dual spring spacer 92 and a block 150, for a six-inch vise, are designed to apply such a force. In addition to the amount of force, however, the direction or directions of applying this force are also to be considered, as discussed in more detail below.

The machinist will select the retaining apparatus 60S, 60D, or 60D' depending on the clamping jaw gap 24*g*, and of course, this jaw gap will depend on the width of the workpiece to be machined. In a six-inch vise, this jaw gap ranges from the smallest gap of 0.500 inch to the largest gap (with the hard jaws removed) of 7.5 inches. In accordance with the present invention, this range of jaw gaps is divided into seven increments as shown in Table 1, below. Table 1 also shows the retaining apparatus 60S, 60D, or 60D' to be used with each increment of jaw gap as well as the block width 152*w* and the plate width 180*w* used with the various increments.

TABLE 1

Increments for Retaining Parallels-Six Inch Vise Example

| Clamping JawGap 24 g (inches) | Retaining Apparatus (Reference No.) | Block Width 152 w (inches) | Plate Width 180 w (inches) |
|---|---|---|---|
| Up to 0.500 | 60S | N/A | N/A |
| 0.500 to 1.250 | 60D | N/A | N/A |
| 1.250 to 2.500 | 60D' | 0.750 | 1.195 |
| 2.500 to 3.750 | 60D' | 1.250 | 1.695 |
| 3.750 to 5.000 | 60D' | 2.500 | 2.945 |
| 5.000 to 6.250 | 60D' | 3.750 | 4.195 |
| 6.250 to 7.500 | 60D' | 5.000 | 5.445 |

With continuing reference to Table 1 above, and for the smallest configuration of clamping, a machinist might choose, for example, a set of parallels 40, 41, each having a 0.125-inch thickness to support a workpiece or part having a 0.500-inch width. For this jaw gap of 0.500, that is, the first increment shown in Table 1, the machinist would use the retaining apparatus 60S employing the single spring spacer 62. Referring to FIGS. 1–5, and assuming that the vise 20 is empty and the jaws 24 are spaced apart in their released position, the parallels 40, 41 are initially placed against their respective jaws, as shown in FIGS. 1 and 2. The machinist then grasps the single spring spacer 62 by the end tabs or handles 76, 78, and 80 and lowers the leaf spring 64 into the vise between the parallels with the lower edge 72 resting on the ways 22. Because of the width 64*w* of the leaf spring 64, it will be noted from FIG. 2 that the leaf spring extends upward from the ways 22 a distance less than the height 40*h* of the parallels, so that the single spring spacer 62 is below the area of the machining operation.

With the leaf spring 64 positioned in the vise as described, the movable jaw 24 is moved toward clamping position so that the convex surface 68 contacts one of the parallels 40 and the opposite ends of the concave surface 66 contact the end edges 48 of the other parallel 41. At this point it is to be observed that in its relaxed or non-stressed condition, the leaf spring lies along a predetermined arc, having a four-inch radius in the preferred embodiment for a six-inch vise. When the machinist is setting up the vise 20 with the retaining apparatus 60S, he initially actuates the vise toward clamping position so the parallels just barely engage the leaf spring 64 without significantly bending it, thereby to allow the machinist an opportunity to center the leaf spring transversely of the vise and also to ensure the lower end tabs 78 are projecting downward adjacent to the outside of the ways 22, as shown in FIG. 2.

After the single spring spacer 62 has been thus positioned in the vise 20, the workpiece, not shown, is inserted between the jaws 24 and rested on the ledges 44 of the parallels above the retaining apparatus 60S. Then, the movable jaw 24 is moved toward the stationary jaw in order to clamp the workpiece therebetween. At the same time, the leaf spring 64 is compressed into its stressed condition wherein it extends over a wider arc with a greater radius than in its relaxed condition.

With the workpiece, not shown, thus clamped between the jaws 24 and with the leaf spring 64 compressed between the parallels 40, 41 (FIG. 1) the leaf spring exerts an end force Fe (FIGS. 1A and 1C) against each end 46 of the parallel 41, and more specifically against each end edge 48 of the parallel. This end force has a component Fp which is directed perpendicularly against the inside face 50 of the parallel and a component Fl which is directed inwardly against the end of the parallel and lengthwise of the parallel. Since the forces Fe are applied at each end of the parallel, their longitudinal component forces Fl are directed in opposite directions inwardly on the parallel.

Compression of the leaf spring 64 between the parallels 40, 41 also causes a central force Fc to be directed against the center of the other parallel 40 (FIG. 1B). This central force is applied perpendicularly against the inside face 50 of the parallel 40.

With the leaf spring 64 compressed between the parallels 40 and 41, as described, the forces Fc and Fp are adequate to develop the required seven pounds pressure to force the parallels against their respective jaws 24. Also, the oppositely directed forces Fl restrict movement of the parallel 41 transversely across the face 30 of its respective jaw 24. Transverse movement of the single spring spacer 62 is also restricted because the lower end tabs 78 overlap and engage the outsides of the ways 22.

Referring now to FIGS. 6 and 7 and to Table 1 above for the next increment of jaw gap 24*g*, namely, between 0.500 to 1.250 inch, the machinist would select the desired pair of parallels 40, 41, for example, a set each having a thickness of 0.125 inch, and would place them against their respective jaws 24 while the latter are in their open position. For this increment of jaw gap, and taking advantage of the present invention, the machinist would select the retaining apparatus 60D (FIGS. 6 and 7). It is to be remembered that the embodiment 60S is for very thin workpieces (very narrow jaw gaps) so that with jaw gaps 24*g* over 0.500 inch, it is preferred to utilize the retaining apparatus 60D which can develop the required force with wider jaw gaps.

Thus, using the retaining apparatus 60D, the machinist grasps the handles 108 (FIG. 6) and compresses the main coil springs 160 as well as the leaf springs 94. While being held in this compressed condition, the retaining apparatus 60D is lowered into the vise 20 between the parallels 40, 41 until the lower edges 122 of the leaf springs 94 rest against the ways 22, as best seen in FIG. 7. As with the positioning of the retaining apparatus 60S, the movable jaw 24 is moved toward, but not moved into, final clamping position. Instead, the jaws are spaced far enough apart to allow adjustment of the retaining apparatus 60D to make sure it is centered in the vise 20 and that the end tabs 110 project downward on the outside surfaces of the ways 22. The handles 108 are then released allowing the leaf springs 94 to expand into firm contact with the end edges 48 of the parallels 40, 41, as shown in FIG. 6.

The workpiece, not shown, is then placed in the vise 20 (FIGS. 6 and 7) and the movable jaw 24 is moved into clamping position further compressing the leaf springs 94 and urging the parallels 40, 41 tightly against their respective jaws. Because each leaf spring 94 engages its parallel 40, 41 similarly to the single spring spacer 62, forces Fp and Fl are exerted against each of the parallels where the leaf springs 94 contact the end edges 48, not only forcing them against their respective jaw but restricting their movement transversely of the jaw. Once again, the preferred dimensions of the retaining apparatus 60D enable it to exert the required seven pounds of force against the parallels. Also, the end tabs 110 restrict transverse movement of the dual spring spacer 92 relative to the vise 20. Thus, the machinist can now complete the entire operational cycle, as described above, and the parallels will stay in intimate contact with the jaws, avoiding the above described problems with devices and practices used prior to the present invention.

Once again referring to Table 1 above, the third increment of jaw gap is 1.250 to 2.500 inches and, according to the method of the present invention, involves the use of the retaining apparatus 60D' (FIGS. 9 and 10). Here, it is desired to continue to use the same dual spring spacer 92 with wider jaw gaps, but if used alone as with the second increment of jaw gap, the dual spring spacer having the construction specified in the described preferred embodiment would not develop the necessary seven pound force. Therefore, with reference to FIG. 9, the retaining apparatus 60D' includes a dual spring spacer 92 and a block spacer 150. For the jaw gap increment 1.250 to 2.500 inches, a block spacer is selected with having a block width 152*w* of 0.750 inch and a plate width 180*w* of 1.195 inch.

As with the previous two increments described, the jaws 24 are opened and the selected parallels 40, 41 are initially inserted against their respective jaws (FIGS. 9 and 10). Then, the selected block spacer 150 is placed in the vise 20 with the bottom surface 158 of the block 152 resting on the ways 22 (FIG. 10), with the outside surface 162 facing and adjacent to one of the parallels 40, with the extended ends of the auxiliary coil springs 190 against this parallel, and with the end plates 180 in slideable, overlapping relation to the outsides of the ways 22 and the jaws 24. As previously described, the block 152 is longer than the width of the ways or the jaws (FIG. 9) to allow for this overlapping relationship of the end plates.

Next, the dual spring spacer 92 is grasped by the machinist in the same manner as described with regard to the use of the retaining apparatus 60D. In FIG. 10, the dual spring spacer 92 is shown above the vise in the position that it would be held by a machinist just prior to insertion between the parallel 41 and the block. The dual spring spacer is then lowered into the vise 20 between the block 152 and the other parallel 41 until the lower edges 122 of the leaf springs 94 rest on the ways 22 whereupon the handles 108 are released.

When the leaf springs 94 (FIG. 9) are centered in the vise 20 and compressed between the block 152 and the parallel 41, the concave surfaces 100 of the leaf springs respectively engage the parallel 41 and the block 152. In the case of the parallel 41, the engagement between the leaf spring and the parallel is the same as described with reference to the single spring spacer 62, and the same as described with reference to the dual spring spacer 92 used alone. With the block 152, however, the concave surface of the adjacent leaf spring engages the inside end edges of the block and sets up forces similar to those described with reference to the engagement of the leaf springs directly against the parallels. Also, when the dual spring spacer is under such compression, the small auxiliary coil springs 190 are likewise compressed between the block and the parallel 40.

After the retaining apparatus 60D' is positioned as described above (FIGS. 9 and 10), the workpiece, not shown, is placed in the vise 20 on the ledges 44 and between the jaws 24 and clamped therebetween, causing further compression of the dual leaf springs 94 and the auxiliary coiled compression springs 190. As before, the dual spring spacer and the block 152 develop the necessary seven pounds of force in order firmly to retain the parallels against the blocks. Also, the parallel 41 is restricted in its transverse movement by end forces Fl. The rear and lower tabs 182 and 184 of the end plates 180 restrict movement of the block 152 relative to the vise, and the rear tabs 182 which overlap the opposite ends of the parallel 40 restrict transverse movement of the parallel 40 relative to its jaw.

From the foregoing, it will be understood that the block spacer 150 (FIG. 9) in combination with the dual spring spacer 92 accommodates wider jaw gaps 24*g* than can be served by the dual spring spacer 92 alone. It is to be noted here that several objectives must be kept in mind. First, it is necessary to develop sufficient force, as described above, to maintain the parallels 40, 41 firmly against their jaws 24. Secondly, to facilitate manual operation of the dual spring spacer 92, the handles 108 must be spaced apart a convenient distance to allow the machinist to grasp the handles in each hand and to compress the main coil springs 130 and still allow the leaf springs 94 to expand sufficiently to develop the required force with particular jaw gaps 24*g*.

For a six-inch vise, as 20, the preferred size of the dual spring spacer 92 is as shown and described. To accommodate jaw gaps 24*g* larger than 1.250 inch, the invention thus adds block spacers 150 with the widths 152*w* and 180*w* varying in accordance with the increment of jaw gap utilized, the increment 1.250 to 2.500 having been described above. For the jaw gaps from 2.500 inch to 7.500 inch, the same dual spring spacer 92 is used with block spacers 150 varying with the dimensions set forth in Table 1.

In summary of the operation of the subject apparatus and the performance of the subject method, the machinist sets up the vise 20 in accordance with the workpiece to be machined and thus the required jaw gap 24*g*. Depending on the size of the jaw gap, either the retaining apparatus 60S, the retaining apparatus 60D, or the retaining apparatus 60D' is selected. After the parallels 40, 41 are placed in the vise, the selected retaining apparatus is inserted between the jaws and thus between the parallels. When the retaining apparatus is properly centered, the single spring spacer 62, if used, or the dual spring spacer 92, if used, is released and allowed to expand against the adjacent surfaces of the parallels, and the block 152, if used. Then, the workpiece is placed in the vise 20 on the parallels 40, 41 and between the jaws 24 and the jaw gap 24*g* is closed, further compressing the spring 64, or the springs 94, or the springs 94 and 190, whichever are used. The machining operation is then performed, the parallels being firmly held in their proper positions during the operation and the retaining apparatus 60S, 60D, or 60D' being held in its position by the clamping of the jaws as well as the engagement of the tabs 76, 78, 80, 110, 182, or 184, as the case may be, with the ways 22.

After the machining operation is completed and while the workpiece is still held in the jaws 22, the surfaces are cleaned with an air blast whereupon the jaws are opened and the workpiece is removed. Next, the area between the parallels 40, 41 is further cleaned with an air blast. During both of these cleaning steps, the selected retaining apparatus 60S, 60D, or 60D' firmly retains the parallels 40, 41 against the jaws and against transverse movement across the faces of the jaws. Following the second cleaning operation, the jaws are fully opened in order to enable preparation of the vise 20 for the next job; that is, to allow for changing of the parallels as well as the retaining apparatus.

Because the apparatus and method of the present invention dependably retains the parallels against the jaws of a vise, throughout a wide range of jaw gaps, the objects of the present invention are achieved. Since the parallels stay intimately against their jaws during the entire operational cycle of the machining process, even if accidentally bumped, machining chips are unable to wedge between the parallels and the jaws, and the parallels remain in their proper positions for the machining operation being performed. Thus, the machining operation is less likely to be compromised because of misalignment of the parallels, and the time and effort of the machinist in resetting the parallels is obviated. Moreover, the retaining apparatus of the present invention has a low profile and is located under the area where the machining takes place and where it does not interfere with such process. If, however, the machine tool does accidentally happen to contact the retaining apparatus, the latter is damaged and sacrificed rather than the more expensive machine tool.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A workpiece holding apparatus, comprising:

a vise having a pair of jaws, at least one of which is movable toward and away from the other jaw between closed and open positions, at least one parallel positioned against one of the jaws, and means for applying forces inwardly against the parallel in order to resist movement of the parallel outwardly away from the jaw and lengthwise of the parallel to resist movement of the parallel transversely of the jaw.

2. The apparatus of claim 1, wherein said means is capable of applying forces against opposite ends of the parallel whereby the force at each end has a first component directed against a side of the parallel generally perpendicularly thereof to resist said outward movement and a second component directed against its adjacent end of the parallel generally lengthwise thereof, said second components being directed in opposite directions relative to the parallel so as to resist said transverse movement.

3. The apparatus of claim 1, wherein said applying means is spring means including an elongated, longitudinally curved, longitudinally resilient leaf spring which is normally relaxed to define a predetermined arc and which can be resiliently stressed lengthwise thereof to define a greater arc, said spring means being positioned between said jaws with said leaf spring extending transversely of the path of movement of the movable jaw so that the leaf spring is stressed when the jaws are closed and forces are applied by the leaf spring against the parallel to hold the parallel against its jaw.

4. A workpiece holding apparatus, comprising:

a vise having jaw means including a pair of jaws providing a variable jaw gap, at least one parallel positioned against one of the jaws, and an elongated, longitudinally resilient leaf spring having opposite ends and being curved from end to end about an axis extending transversely of the spring, said spring being longer than said parallel and being positioned between said jaws and extending lengthwise of the parallel with the concave surface of the spring engaging opposite ends of the parallel at pressure points thereon and with the convex surface of the spring facing in the opposite direction, said jaw means being capable of applying pressure against said convex surface and at said pressure points thereby to compress the leaf spring whereby forces are set up at the pressure points having components perpendicular to the parallel to force the parallel against its jaw and components directed inwardly in opposite directions lengthwise of the parallel to resist movement of the same transversely of its jaw.

5. The apparatus of claim 4, further including:

a second parallel positioned against the other jaw, a second leaf spring substantially identical to the first spring, said springs being joined at their convex surfaces in back-to-back, generally X-shaped relation, said jaw means being capable of applying pressure against said concave surface of the second spring at second pressure points generally aligned with the respective pressure points of the first spring, whereby forces are set up at the second pressure points having components perpendicular to the second parallel to force the second parallel against its jaw and components directed inwardly in opposite directions lengthwise of the second parallel to resist movement of the same transversely of its jaw.

6. The apparatus of claim 5, further including:

a spacer block interposed the second parallel and the second leaf spring, said concave surface of said second leaf spring engaging opposite ends of the block at said second pressure points, whereby the forces perpendicular to the block at said second pressure points are transmitted through the block to the second parallel.

7. The apparatus of claim 6, further including:

plates on opposite ends of the block engaging opposite sides of the vise and limiting movement of the block transversely of the path of the jaws.

8. The apparatus of claim 6, further including:

compression springs interposed the block and the second parallel for enabling resilient movement of the block toward the second parallel.

9. The apparatus of claim 5, further including:

opposed pairs of handles projecting outwardly from opposite ends of the leaf springs, and coiled compression springs between the opposed pairs of handles compressible along with the leaf springs upon moving the handles toward each other, and tabs extending from the ends of the leaf springs and engaging opposite sides of the vise and limiting movement of the leaf springs transversely of the path of the jaws.

* * * * *